Patented Apr. 15, 1941

2,238,682

UNITED STATES PATENT OFFICE

2,238,682

POLYMERIC REACTION PRODUCT OF AMIDES WITH MONOVINYL ACETYLENES

Harry Ben Dykstra, Wilmington, Del., and Ralph Albert Jacobson, Landenberg, Pa., assignors to E. I. du Pont de Nemours & Company, Wilmington, Del., a corporation of Delaware No Drawing. Application July 20, 1939, Serial No. 285,588

14 Claims. (Cl. 260—92)

This invention relates to the condensation of buten-1-yne-3, hereinafter referred to as monovinylacetylene, with organic nitrogen compounds and, more particularly, to the condensation of monovinylacetylene with amines and amides.

The invention has as an object the preparation of condensation products. A further object is the preparation of materials useful in the preparation of films, molding compositions, oil resistant rubber compositions, etc. Other objects will appear hereinafter.

These objects are accomplished by the following invention wherein monovinylacetylene is reacted, preferably in the presence of a catalyst, e. g., an alkali metal, or an oxide, hydroxide, or alkoxide thereof, at a temperature of 75–175° C., but preferably 105–150° C., under pressure, with an organic amine or amide having at least one hydrogen on the amido or amino nitrogen.

The reaction is generally carried out in a closed vessel under nitrogen pressure, the reaction mixture being agitated and heated. The pressure rises when the vessel becomes heated and the subsequent reaction can often be noted by the pressure drop. After the reaction is complete, the reaction mixture is treated by extraction with suitable solvent such as hot methanol to remove any unreacted amine or amide. In general, no monomeric products, with the exception of unchanged reactants, are found in the extract. The polymeric reaction products which generally consist of brown to yellow powders can be further purified by dissolution in a suitable solvent and reprecipitation by mixing the solution with methanol or other appropriate non-solvents. The products of the reaction are capable of being cast into films or molded into chips.

The more detailed practice of the invention is illustrated by the following examples, wherein parts given are by weight. There are of course many forms of the invention other than these specific embodiments.

Example I

A mixture of 65 parts of acetamide and 5 parts of sodium is refluxed in benzene for 16 hours, then the benzene is distilled off. This material along with 57 parts of monovinylacetylene is heated in a steel bomb for seven hours at 105° C. The reaction mixture is extracted with benzene until the extract becomes clear. The evaporation of the benzene extract gives 28 parts of a dark viscous liquid. This liquid is treated with methyl alcohol, which precipitates a brown powder which is removed by filtration. The evaporation of methanol from the filtrate produces a soft resin soluble in benzene containing 6.65% nitrogen. Transparent films may be cast from solutions (e. g., a benzene solution) of this material, the films becoming insoluble after prolonged standing at room temperature, or after baking at 75° C. for a few hours.

Example II

A mixture of 23.6 parts of acetamide, 31.2 parts of monovinylacetylene and 2 parts of sodium is placed in a bomb, nitrogen pressure applied and the mixture heated at 130–40° C. for 6 hours. The reaction mixture is extracted with 125 parts of hot methanol. There remain 15 parts of a light tan powdery residue. This powder after washing thoroughly with water and methyl alcohol and drying contains 2.4% nitrogen. This corresponds to a product containing ten monovinylacetylene residues to one acetamide residue. The percentage of nitrogen for a 1:1 addition is 12.61%. The methanol extract, when poured into water, yields 4 parts of a dark gum which contains 8.3% nitrogen. This corresponds to 2.1 monovinylacetylene:1 acetamide addition.

Example III

A mixture of 46 parts of diphenylamine, 21 parts of monovinylacetylene, and 2 parts of potassium hydroxide is placed in a bomb and nitrogen pressure applied. The mixture is heated and agitated at 150° for 4 to 5 hours. After the reaction mixture has been extracted with two 160 parts portions of hot methanol, pulverized, and dried, the residue weighs 30 parts. It is soluble in dioxan and benzene. A small amount of this material is purified by dissolving in dioxan and precipitating in methanol. It contains 4.51% nitrogen. This material when molded at 70° under 5000 lbs. pressure for 6 minutes gives a somewhat colored chip. A film prepared by casting from a dioxan solution and baking for 4 hours at 70° is insoluble in dioxan and benzene.

Example IV

A mixture of 46 parts of diphenylamine, 0.5 parts of hydroquinone, 2 parts of potassium hydroxide and 21 parts of monovinylacetylene is heated in a bomb at 150° for 4.5 hours. The reaction product, after being pulverized and extracted with hot methanol, yields 14 parts of a brown powdery residue. Concentration of the methanol extract yields only diphenylamine.

Example V

A mixture of 33.4 parts of carbazole, 15.6 parts of monovinylacetylene, 1 part of potassium hydroxide and 25 parts of dioxane is heated in a bomb at 140° for 6 hours. After removing the solvent on a steam bath, an extraction of this material with 1200 parts of hot methanol yields 28.5 parts of a brown powdery residue. This is soluble in dioxane, benzene, carbon tetrachloride and ethyl acetate. By dissolving this material in benzene and reprecipitating with petroleum ether or methanol, various fractions are obtained with nitrogen contents varying from 4.72% to 6.09%. A 1:1 addition product of monovinylacetylene and carbazole has a theoretical nitrogen content of 6.39%. The fraction containing 4.72% nitrogen is moldable to a somewhat colored molded article.

Example VI

A mixture of 50 parts of thiodiphenylamine, 35 parts of dioxane, 2 parts of potassium hydroxide and 19.5 parts of monovinylacetylene is heated in a bomb at 100° for 7 hours. The removal of the solvent and the extraction of the reaction mixture with 700 parts of boiling methanol yields 8 parts of a light brown powdery residue which is soluble in benzene, dioxane and ethyl acetate. Purification of this material by dissolution in dioxane and reprecipitation with methanol gives a product containing 0.99% nitrogen and 3.19% sulfur.

Although the temperature range preferably used is from 105–150° C., it is possible to operate at temperatures ranging from 75 to 175° C. However, the practicability of operating the reaction at these temperatures is limited by the slowness of the reaction at low temperatures and excessive polymerization and possible thermal decomposition of the monovinylacetylene at higher temperatures. The use of nitrogen pressure of about 100 lbs. per sq. in. is largely a matter of convenience and the process can be operated merely under the pressure generated by the monovinylacetylene. However, the nature of the reaction is such that it is aided by higher pressures, e. g., up to 40 atmospheres or even higher.

Any alkali metal catalyst, e. g., an alkali metal of group I of the periodic table, e. g., potassium, lithium, and rubidium may be used to catalyze the reaction. However, the availability of sodium causes it to be preferred above the others. In Example I, the sodium and the acetamide were allowed to react to form the sodium derivative. However, in Example II, the sodium is merely added to the mixture of the acetamide and the monovinylacetylene, and this procedure is generally satisfactory in those cases where the reaction temperature is above the melting point of the sodium. Among other catalysts which can be used are the various alkali metal oxides of the first group, e. g., sodium oxide, potassium oxide and lithium oxide, their alkoxides, e. g., sodium ethoxide, sodium methoxide, lithium ethoxide and lithium methoxide and their hydroxides, e. g., sodium, lithium, and potassium hydroxides.

The presence of any inert solvent which would tend to make a fluid melt of the reaction mixture greatly facilitates the reaction. In cases where the nitrogen compound melts at the reaction temperature or below, there is probably no great advantage in the use of a solvent. In Example V, dioxane is used as a solvent. Any inert solvent which dissolves the reactants is operable, e. g., benzene, toluene, xylene, dibutyl ether, the dimethyl ether of tetraethylene glycol, the diethyl ether of diethylene glycol, etc.

In general, any organic ammonia type compound having at least one hydrogen atom on the ammonia type nitrogen and not more than one organic acyl group on the ammonia type nitrogen may be used. In the case of amides, primary amides having not more than seven carbons in the acyl group are preferred. Where the amide is a secondary one, the alkyl group on the amido nitrogen is preferably not more than four carbon atoms. There may thus be employed propionamide, butyramide, N-methylacetamide, N-ethylacetamide, thioacetamide and thiopropionamide. The preferred amides may be formulated as of the formula R—CO—NH—X where R is a hydrocarbon radical of up to seven carbon atoms and X is hydrogen or an alkyl group of up to four carbon atoms.

Any primary or secondary amine may be employed in the reaction including, in addition to those shown in the examples, methylamine, dimethylamine, aniline, N-methylaniline, alpha-naphthylamine, phenyl-alpha-naphthylamine, dodecylamine, cetylamine, octadecylamine, ethylenediamine, hexamethylenediamine, decamethylenediamine. The amine may contain a hetero atom in the hydrocarbon chain, such as the thiodiphenylamine of Example VI.

Monovinylacetylene itself is the preferred reactant for reaction with the amine or amide. However, monovinylacetylene substituted in the vinyl group may also be employed, e. g., 2-methylmonovinylacetylene(2-methylbuten-1-yne-3), and 1,2-dimethyl-monovinylacetylene(1,2-dimethylbuten-1-yne-3).

While the exact course of this reaction is not known, the polymeric products probably result from the addition of the nitrogen compounds to monovinylacetylene and the polymerization of this monomeric addition product. Reactions of the nitrogen compound with monovinylacetylene

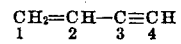

could take place by way of 1,2; 1,4 or 3,4 addition, or by a plurality of simultaneous additions, e. g., 1,2 and 3,4. For example, if the addition of diphenylamine takes place in the 1,4 fashion, and the product subsequently undergoes a shift analogous to that which is known to take place in the addition of hydrogen chloride to monovinylacetylene to yield 2-chlorobutadiene-1,3, the compound would have the following structure:

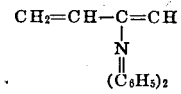

Thus the process probably consists of the addition of a nitrogen compound to monovinylacetylene to produce a monomer of unknown structure which polymerizes to give a resinous material. In the case of the reaction between carbazole and monovinylacetylene (Example V, the nitrogen content of the product very closely approaches that of the theoretical amount required to a 1:1 addition product.

In some cases, monovinylacetylene interpolymerizes with the monomeric nitrogen addition product. This, of course, accounts for some of the products having a lower nitrogen content. These products may also have been formed by the polymerization of a monovinylacetylene and the subsequent addition of the amine or amide to this unsaturated polymer.

The products of this invention may be used to produce new compositions of matter of value as film-forming and molding compounds, for the production of insulating material, and as ingredients in mixtures of rubber-like materials in order to improve their properties, especially their resistance to oil. They may also be used in the preparation of impregnating, insecticidal, and coating compositions.

The present invention is of advantage in producing new and useful products by a new process. It is of advantage in the production of polymers by a one-step combination addition-polymerization process.

The above description and examples are intended to be illustrative only. Any modification of or variation therefrom which conforms to the spirit of the invention is intended to be included within the scope of the claims.

We claim:

1. A polymeric reaction product of an organic amide having on the amido nitrogen, at least one hydrogen atom and not more than one organic acyl group, and a member of the group consisting of monovinylacetylene and monovinylacetylenes substituted in the vinyl group.

2. A polymeric reaction product of monovinylacetylene with an organic amide having at least one hydrogen on the amido nitrogen and not more than one acyl group on the nitrogen.

3. A polymeric reaction product of monovinylacetylene with a primary organic amide of a carboxylic acid of up to eight carbon atoms.

4. A polymeric reaction product of monovinylacetylene with an aromatic amine having at least one hydrogen atom on an amino nitrogen atom.

5. A polymeric reaction product of monovinylacetylene with a secondary aromatic amine.

6. Process of preparing polymers which comprises heating a member of the class consisting of monovinylacetylene and monovinylacetylenes substituted in the vinyl group with an organic amide having on the amido nitrogen, at least one hydrogen atom and not more than one acyl group and that organic.

7. Process of preparing polymers which comprises reacting at elevated temperature and pressure, monovinylacetylene with an organic amide having on the amido nitrogen, at least one hydrogen atom and not more than one acyl group and that organic.

8. Process of claim 7 wherein the reaction is carried out under pressure at 75–175° C. in the presence of an inert organic solvent.

9. Process of preparing polymers which comprises heating monovinylacetylene under pressure at 105–150° C. in the presence of an alkali metal catalyst in the presence of an inert solvent with an organic amide having at least one hydrogen on the amido nitrogen.

10. Process of preparing polymers which comprises heating monovinylacetylene under pressure at 105–150° C. in the presence of an alkali metal catalyst in the presence of an inert solvent with a primary organic amide having up to eight carbon atoms.

11. Process of preparing polymers which comprises heating monovinylacetylene under pressure at 105–150° C. in the presence of an alkali metal catalyst in the presence of an inert solvent with an aromatic amine having at least one hydrogen on an amino nitrogen.

12. Process of preparing polymers which comprises heating monovinylacetylene under pressure at 105–150° C. in the presence of an alkali metal catalyst in the presence of an inert solvent with a secondary aromatic amine.

13. Process of claim 7 wherein the reaction is carried out under pressure at 105–150° C., in the presence of an inert organic solvent and in the presence of a catalyst selected from the class consisting of alkali metals, and oxides, hydroxides and alkoxides thereof.

14. A polymeric reaction product of monovinylacetylene with an organic compound having a tervalent nitrogen atom, the valences of which are satisfied thru hydrogen and carbon, at least one valence being satisfied by hydrogen and not more than one by an organic acyl group, said compound being selected from the class of amides and aromatic amines.

HARRY BEN DYKSTRA.
RALPH ALBERT JACOBSON.